PHONOGRAPH RECORD CASE

Filed April 24, 1961

INVENTOR.
WALTER G. STEWART, JR.
BY John R. Walker, III
Attorney

United States Patent Office 3,043,492
Patented July 10, 1962

3,043,492
PHONOGRAPH RECORD CASE
Walter G. Stewart, Jr., 1034 Audubon Drive, Memphis, Tenn.
Filed Apr. 24, 1961, Ser. No. 104,977
2 Claims. (Cl. 229—52)

This invention relates generally to phonograph record cases and more particularly to a device for shipping, carrying, protecting and storing of phonograph records and the like.

Phonograph records, being of a somewhat delicate nature, present problems of storage, handling and shipping both to dealers and consumers. Records are often seriously damaged because they were stacked loosely or because they were not adequately protected for mailing or because the owner had no way of transporting the records from one place to another.

Thus, one of the objects of the present invention is to provide a device which will give adequate protection to phonograph records while the records are being stored, transported, shipped, or used.

A further object is to provide a record case formed from a light material such as cardboard or the like which because of the unique structure of the case makes an unusually strong container for the records.

A further object is to provide a rigid and sturdily constructed container which is adapted to withstand rough handling.

A further object is to provide a container which is assembled from a flat cardboard blank adapted to be sent by the manufacturer thereof to the dealer or consumer who can then quickly and easily form the blank into the container of the present invention for storing, transporting, shipping or selling records.

A further object is to provide an improved record case which is inexpensive to manufacture.

A further object is to provide a record case wherein the top will be securely locked while carrying.

A further object is to provide an inexpensive gift container for retail stores.

A further object is to provide an adequate means for storing record albums as such.

A further object is generally to improve the design and construction of phonograph record cases.

The means by which the foregoing and other objects of the present invention are accomplished and the manner of their accomplishment will be readily understood from the following specification upon reference to the accompanying drawings, in which.

Figure 1:
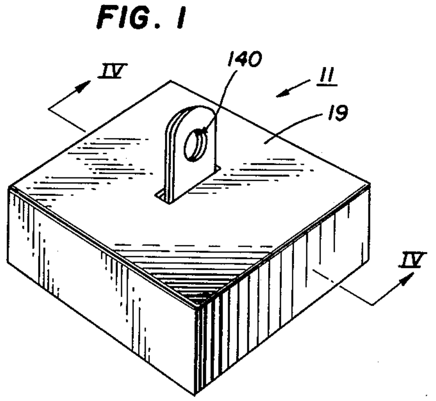
FIG. 1 is a perspective view of the case fully assembled.

Referring now to the drawings in which the various parts are indicated by numerals, the record case 11 of the present invention comprises, in general, a flat bottom 13, a handle 15 of cardboard or the like, a platform 17 and a cover 19.

Figure 3:
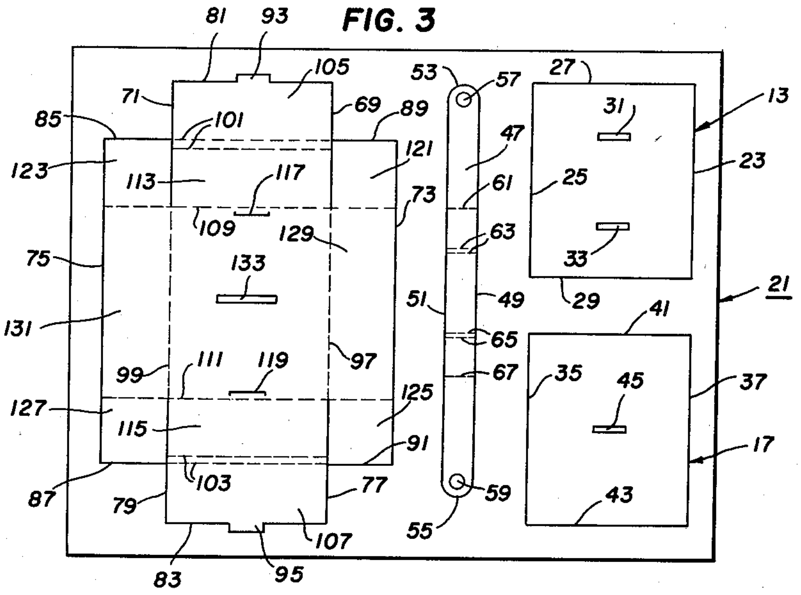
FIG. 3 is plan view of a flat piece of cardboard which has been scored so that the various parts can be removed therefrom for assembly into the case of the present invention.
Figure 4:
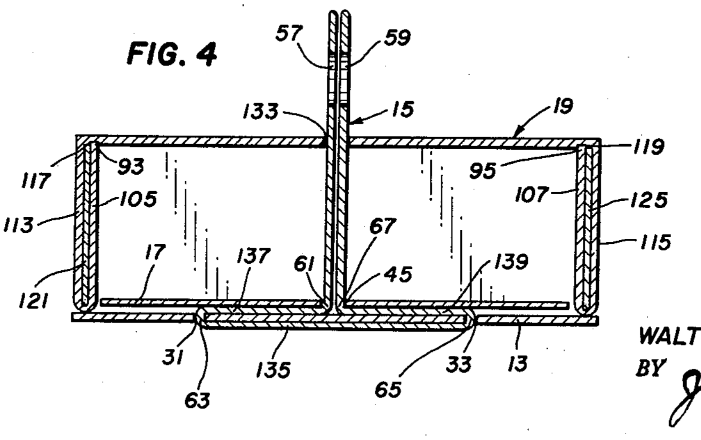
FIG. 4 is an enlarged cross sectional view as taken along the line IV—IV of FIG. 1.

Referring now, more specifically, to case 11, the entire case is preferably made of corrugated cardboard and preferably manufactured in the unassembled flat form out of one piece or blank 21 of cardboard or the like as depicted in FIG. 3. The flat bottom 13 is obtained from the part of blank 21 circumvented by the deeply scored parallel lines 23 and 25 and the deeply scored parallel lines 27 and 29, which deep scores allow the bottom 13 to be easily separated from the remainder of blank 21. Flat bottom 13 has a pair of spaced parallel slots 31 and 33 which are also formed by deeply scoring the periphery of the slots and forcing out the center of the slots upon assembly.

Platform 17 is obtained from the part of blank 21 circumvented by the deeply scored parallel lines 35 and 37 and the deeply scored parallel lines 41 and 43, which scored lines allow the platform to be easily separated from the remainder of blank 21. Platform 17 has a passage 45 formed by deeply scoring the periphery of the passage and forcing out the center portion thereof upon assembly.

A strip 47 is obtained from the part of blank 21 circumvented by the deeply scored parallel lines 49 and 51 and the deeply scored curved lines 53 and 55, which deeply scored lines allow the strip to be easily separated from the remainder of the blank 21. Adjacent curved lines 53 and 55 of strip 17 are apertures 57 and 59 respectively. The apertures are obtained by deeply scoring their periphery and forcing out the center portion thereof upon assembly. Perpendicular to deeply scored parallel lines 49 and 51 of strip 47 are crimped or shallowly scored parallel lines 61, 63, 65 and 67 which afford lines of bending of the strip 47 which is necessary upon assembly. Each of score lines 63 and 65 preferably comprises a double score line so that a 180 degree bend can be made thereat. Upon assembly, a portion of strip 47 establishes handle 15 in a manner later to be described.

Cover 19 is obtained from the part of blank 21 circumvented by deeply scored parallel lines 69 and 71, 73 and 75, 77 and 79, 81 and 83, 85 and 87, and 89 and 91, which scored lines allow the piece to be easily separated from blank 21. Deeply scored lines 81 and 83 are offset at their center to form tabs 93 and 95, respectively. Crimped or shallowly scored lines 97 and 99 are a continuation of deeply scored lines 69 and 71, respectively, which join deep scored lines 77 and 79, respectively. Perpendicular to deeply scored lines 69 and 71, and 77 and 79 are crimped or shallowly scored lines 101 and 103, respectively, which afford lines of bending to establish portions 105 and 107, respectively. Each of score lines 101 and 103 preferably comprises a double score line so that a 180 degree bend can be made thereat. Perpendicular to deeply scored lines 73 and 75 are crimped or shallowly scored lines 109 and 111, respectively, which afford lines of bending to establish portions 113 and 115, that is, the portion between lines 101 and 109 is designated 113 and the portion between lines 103 and 111 is designated 115. Adjoining shallowly scored lines 109 and 111 at their centers are deeply scored offsets 117 and 119, respectively.

Deeply scored lines 69, 71, 77 and 79 perpendicularly intersect crimped or shallowly scored lines 109 and 111 isolating flap portions 121 and 123, and 125 and 127, respectively. Portion 129 is the portion circumvented by shallowly scored lines 97, 109 and 111 and the deeply scored line 73. Portion 131 is the portion circumvented by shallowly scored lines 99, 109 and 111 and the deeply scored line 75. Within the portion circumvented by lines 97, 99, 109 and 111 is an elongated central opening 133 which is formed by deeply scoring its periphery and forcing out the center portion thereof upon assembly.

The function of the various scores, passages, offsets, openings, flaps, tabs and apertures will now be explained in detail in the following description of the assembly of case 11.

Figure 2:
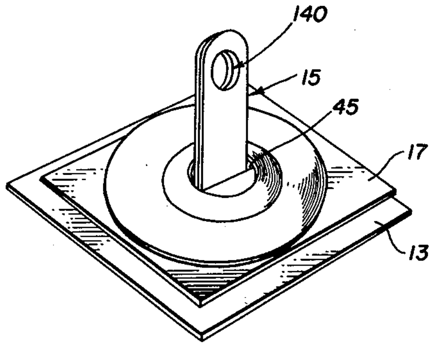
FIG. 2 is a perspective view of the case without the cover, showing a record in place thereon.

Strip 47 is placed so that it extends below flat bottom 13 to establish the underportion 135 thereof and the strip then has one of its ends passing through slot 31 and the opposite end passing through slot 33. Strip 47 is bent along shallowly scored lines 63 and 65 to establish overlying portions 137 and 139, which closely overlie flat bottom 13. Strip 47 bends upwardly at shallowly scored lines 61 and 67, which bent portions are brought adjacent one another to establish vertical handle 15 and which bent portions are provided with apertures 57 and 59, respectively, that are in alignment and establish a finger hole 140 for ease in carrying. The platform 17 is placed immediately over flat bottom 13 with handle 15 passing through passage 45. Thus, platform 17 along with the weight of the records, which are placed on platform 17 with handle 15 extending through the center holes thereof as best seen in FIG. 2, force the overlying portions 137 and 139 downwardly and prevent the handle from separating.

Cover 19 is easily formed by punching out the piece from which cover 19 is to be formed from blank 21 and by bending portions 129 and 131 downwardly along lines 97 and 99, respectively, and then bending portions 121, 123, 125 and 127 inwardly along the ends of shallowly scored lines 109 and 111, respectively. Next, portions 113 and 115 are bent downwardly along lines 109 and 111 and then portions 105 and 107 are bent upwardly along lines 101 and 103 with flap portions 121 and 123, and 125 and 127 being enclosed between portions 113 and 105, and portions 115 and 107, respectively. Tabs 93 and 95 are forced into the deeply scored offsets 117 and 119, respectively, which locks the cover 19 in place to establish a very sturdy construction. Cover 19 may now be placed over the records and platform 17 so that the cover rests on flat bottom 13 with the handle 15 passing through and above elongated opening 133 to establish the completely assembled case.

From the foregoing description, it will be understood that a case 11 is formed from a relatively light material, as cardboard or the like, and due to its unique construction a very sturdy case is provided which can withstand the rough handling and weight of a great number of records being carried thereby.

It will further be understood from the foregoing description that the cover will be locked securely in place while carrying since the handle 15 passes through the center of the cover and the carrier's finger extends through the finger hole 140 in the handle 15 to prevent any possible accidental removal of the cover. Thus, complete protection is given to the records against damage and loss.

It will further be understood from the foregoing description that manufacturing cost, storing cost, and shipping cost of the case will be held to a minimum due to the fact that the parts of the case 11 are stamped in a flat blank, which blank is convenient and easy for shipping, and once in the hands of the distributor or consumer the blank can be easily punched out and the case conveniently and quickly assembled by the dealer or the consumer.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A record case comprising a substantially flat rectangular cardboard bottom having a pair of parallel and spaced slots therein, an elongated strip of cardboard including a portion underlying said bottom and including ends respectively extending upwardly through said slots and thence inwardly towards one another to establish portions overlying said bottom and then extending upwardly in close adjacency away from said bottom to establish a handle, said handle being provided with a finger hole therethrough, a substantially flat rectangular cardboard platform slightly smaller in size than said bottom, said platform being provided with a passage therethrough, said platform resting on said overlying portions with said handle extending upwardly through said passage, a downwardly opening substantially box-like cardboard cover comprising a substantially flat rectangular top and sides depending from the edges of said top, said top having an elongated opening therethrough, said cover resting on said bottom with said handle extending upwardly through said elongated opening with said finger hole being above said top, whereby said case is adapted to be carried by a person inserting his finger through said finger hole so that the cover is locked in place.

2. A record case comprising a bottom having a pair of parallel and spaced slots therein, an elongated strip including a portion underlying said bottom and including ends respectively extending upwardly through said slots and thence inwardly towards one another to establish portions overlying said bottom and then extending upwardly in close adjacency away from said bottom to establish a handle, a platform provided with a passage therethrough, said platform resting on said overlying portions with said handle extending upwardly through said passage, whereby records are adapted to be carried on said platform with said handle extending through the central holes therein, said handle being provided with a finger hole adjacent the upper end thereof, whereby said case is adapted to be carried by a person inserting his finger through said finger hole so that records carried on said platform cannot be accidentally removed.

References Cited in the file of this patent

UNITED STATES PATENTS

| | | |
|---|---|---|
| 829,036 | Ryan | Aug. 21, 1906 |
| 1,155,447 | Saunders | Oct. 5, 1915 |
| 1,678,260 | Martino et al. | July 24, 1928 |
| 2,318,973 | Smith | May 11, 1943 |
| 2,954,898 | Freeberg | Oct. 4, 1960 |